US010696868B2

(12) United States Patent
Quinn et al.

(10) Patent No.: US 10,696,868 B2
(45) Date of Patent: Jun. 30, 2020

(54) USE OF AN ADDITIVE AND PAVING GRADE ASPHALT IN SHINGLE COATING ASPHALT COMPOSITION MANUFACTURE

(71) Applicant: Owens Corning Intellectual Capital, LLC, Toledo, OH (US)

(72) Inventors: Robert Edwin Quinn, New Albany, OH (US); Jason Guerra, Tinley Park, IL (US); Laurand H. Lewandowski, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 399 days.

(21) Appl. No.: 15/618,193

(22) Filed: Jun. 9, 2017

(65) Prior Publication Data

US 2017/0275496 A1  Sep. 28, 2017

Related U.S. Application Data

(62) Division of application No. 14/210,791, filed on Mar. 14, 2014, now Pat. No. 9,688,882.

(Continued)

(51) Int. Cl.
*C09D 195/00* (2006.01)
*C08K 5/103* (2006.01)
(Continued)

(52) U.S. Cl.
CPC ............ *C09D 195/00* (2013.01); *C08K 5/103* (2013.01); *C08L 95/00* (2013.01); *C08L 2555/64* (2013.01); *E04D 1/20* (2013.01)

(58) Field of Classification Search
CPC ... C09D 195/00; C08L 95/00; C08L 2555/64; C08K 5/103; C11C 3/00; C10C 3/04; E04D 1/20
See application file for complete search history.

(56) References Cited

U.S. PATENT DOCUMENTS 5,164,002 A    11/1992 Ballenger, Jr. et al.
5,271,767 A    12/1993 Light, Sr. et al.
(Continued)

FOREIGN PATENT DOCUMENTS

EP    568757    11/1993
EP    1717275    11/2006
(Continued)

OTHER PUBLICATIONS

Owens Corning Trumbull, Technical Report, 5 pgs, printed USA, May 1993.
(Continued)

*Primary Examiner* — Alexandra M Moore
(74) *Attorney, Agent, or Firm* — Calfee, Halter & Griswold LLP

(57) ABSTRACT

A shingle coating asphalt composition is provided that is produced from a paving grade asphalt. The shingle coating asphalt composition comprise a paving grade asphalt that has been overblown to achieve a first penetration value that is at or below about 15 dmm and a first softening point that is at least about 210° F. The shingle coating composition may further include an additive that is included in an amount to achieve a second softening point that is less than about 230° F. and a second penetration value that is between about 15 and 20 dmm. The additive may comprise at least one ester. The inventive shingle coating asphalt composition may be thermally stable at processing temperatures of at least 450° F.

16 Claims, 1 Drawing Sheet

Related U.S. Application Data

(60) Provisional application No. 61/787,226, filed on Mar. 15, 2013.

(51) Int. Cl.
*E04D 1/20* (2006.01)
*C08L 95/00* (2006.01)

(56) References Cited

U.S. PATENT DOCUMENTS

| | | |
|---|---|---|
| 6,444,731 B1 | 9/2002 | Memon |
| 6,764,542 B1 | 7/2004 | Lackey et al. |
| 7,951,239 B2 | 5/2011 | Trumbore et al. |
| 9,688,882 B2 | 6/2017 | Quinn et al. |
| 2009/0000514 A1 | 1/2009 | Trumbore et al. |
| 2009/0137705 A1 | 5/2009 | Faucon Dumont et al. |
| 2011/0025923 A1 | 2/2011 | Tsubata |
| 2011/0197785 A1* | 8/2011 | Trumbore ............... C08L 95/00 106/270 |
| 2013/0022823 A1 | 1/2013 | Franks, Sr. |
| 2013/0160674 A1 | 6/2013 | Hong |

FOREIGN PATENT DOCUMENTS

| | | |
|---|---|---|
| EP | 2097475 | 9/2009 |
| EP | 2208768 | 7/2010 |
| GB | 2462322 | 2/2010 |
| WO | 93/00406 | 1/1993 |
| WO | 01/74948 | 10/2001 |
| WO | 05/087869 | 9/2005 |
| WO | 08/117077 | 10/2008 |
| WO | 09/019684 | 2/2009 |
| WO | 09/071653 | 6/2009 |
| WO | 10/128105 | 11/2010 |
| WO | 10/134024 | 11/2010 |
| WO | 11/115858 | 9/2011 |
| WO | 11/126595 | 10/2011 |

OTHER PUBLICATIONS

DaSilva et al. "Determination of Castor Oil Molecular Weight by Vapour Pressure Osometry Technique", Jan. 2011.
Firestone, David (2013), Physical and Chemical Characteristics of Oils, Fats, and Waxes, 3rd edition—1.277 Jojoba Oil, AOCS Press, online version available at: http://app.knovel.com/hotlink/pdf/id:kt00C44E81/physical-chemical-characteristics/jojoba-oil.
Office action from U.S. Appl. No. 14/210,791 dated Jan. 15, 2015.
Office action from U.S. Appl. No. 14/210,791 dated Jul. 15, 2015.
Office action from U.S. Appl. No. 14/210,791 dated Dec. 3, 2015.
Office action from U.S. Appl. No. 14/210,791 dated May 18, 2016.
Office action from U.S. Appl. No. 14/210,791 dated Oct. 3, 2016.
Interview Summary from U.S. Appl. No. 14/210,791 dated Jan. 26, 2017.
Notice of Allowance from U.S. Appl. No. 14/210,791 dated Feb. 24, 2017.

* cited by examiner

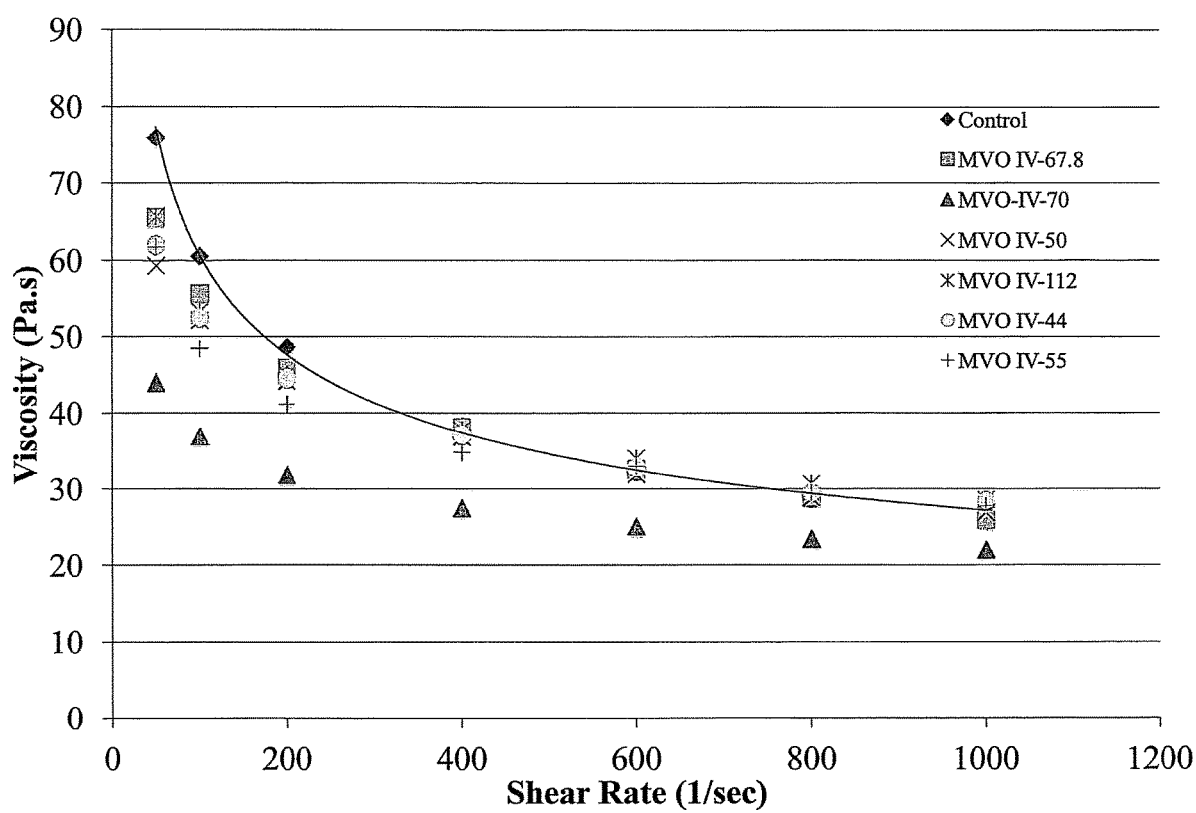

USE OF AN ADDITIVE AND PAVING GRADE ASPHALT IN SHINGLE COATING ASPHALT COMPOSITION MANUFACTURE

This is application is a divisional application of U.S. Ser. No. 14/210,791, filed on Mar. 14, 2014, and issued as U.S. Pat. No. 9,688,882, titled USE OF AN ADDITIVE AND PAVING GRADE ASPHALT IN SHINGLE COATING ASPHALT COMPOSITION MANUFACTURE, which is based on prior U.S. provisional application Ser. No. 61/787,226, filed Mar. 15, 2013, the benefit of which is hereby claimed and the disclosure of which is incorporated herein by reference in their entirety.

FIELD OF THE INVENTION

The present invention relates generally to asphalt roofing products, including asphalt shingles. More particularly the present invention relates to methods and compositions for producing roofing shingle coating asphalt compositions from non-coating grade asphalts, such as paving-grade asphalts.

BACKGROUND

Asphalt compositions suitable for coating roofing shingles are generally produced by selecting a suitable asphalt, or asphalt flux, and processing the asphalt to obtain particular properties useful for a coating asphalt. For instance, it is important that the asphalt in roofing products retain some degree of hardness and do not flow under conditions of high temperature. Such an increased hardness is generally accompanied by a reduced penetration level, an increased viscosity, and an increased softening point.

One way in which the asphalt may be processed consists of air blowing, which is an oxidation process that involves blowing air through molten asphalt to modify the physical properties of the asphalt. In such an air blowing process, air is blown through an asphalt flux for a particular period of time at an elevated temperature. The air blowing asphalts process generally raises the softening point of the asphalt, which increases the shingles' ability to resist flowing at high temperatures on a roof, lowers the shingle penetration into a range that allows proper press of granules without becoming too brittle, raises their melt viscosity such that when filler is added, the filled coating viscosity is in a range that allows the roofing shingle to process at high speeds, and creates a shingle that will perform over many years on the roof in spite of being exposed to sun, high temperatures, and inclement weather conditions.

Conventional asphalt compositions used for manufacturing roofing shingles incorporate a special "coating grade" asphalt as the feedstock to the air blowing process in order to meet the desired properties for a roofing application. Such coating grade asphalts often comprise materials that are naturally softer (higher penetration, lower viscosity) than paving grade asphalts, which are considered "hard" asphalts.

U.S. Pat. No. 7,951,239, the disclosure of which is incorporated herein by reference in its entirety, discloses a method for producing coating asphalts from paving grade asphalt feedstocks. The method includes partially air blowing the paving grade asphalt feedstock to lower its penetration value and raise its softening point. A wax is then added to the partially blown asphalt to further raise its softening point to a point that is within the desired range for a coating asphalt. This process additionally incorporates a blowing catalyst, such as phosphoric acid to further soften the asphalt.

BRIEF SUMMARY

The general inventive concepts are directed to a shingle coating asphalt composition produced from paving grade asphalt. In some exemplary embodiments, the shingle coating asphalt composition includes paving grade asphalt and an additive. The paving grade asphalt is over-blown to a first penetration value that is at or below about 15 dmm and a first softening point that is at least about 220° F. The additive may comprise an ester and is included in an amount to achieve a second softening point that is less than about 220° F. and a second penetration value that is between about 15 and 20 dmm. The inventive shingle coating asphalt composition is thermally stable at processing temperatures of at least 450° F.

The general inventive concepts are further directed to a method for producing a shingle coating asphalt composition from paving grade asphalt. In some exemplary embodiments, the method includes heating a paving grade asphalt to produce a molten asphalt material and then over-blowing the molten asphalt material to achieve a first penetration value that is at or below about 15 dmm and a first softening point that is at least about 220° F. The method may further include mixing an additive into the molten asphalt material, forming a shingle coating asphalt composition. The additive may comprise an ester compound, the inclusion of which forms a shingle coating asphalt composition having a second softening point that is less than about 230° F. and a second penetration value that is between about 15 and 20 dmm. The shingle coating asphalt composition is thermally stable at temperatures up to at least 450° F.

The general inventive concepts further relate to a roofing product having a coating made from a shingle coating asphalt composition. The shingle coating asphalt composition may comprise a paving grade asphalt that is over-blown achieve a first penetration value that is at or below about 15 dmm and a first softening point that is at least about 220° F. The shingle coating asphalt composition may further include an additive. The additive may comprise an ester and is included in an amount to achieve a second softening point that is less than about 220° F. and a second penetration value that is between about 15 and 20 dmm. The inventive shingle coating asphalt composition is thermally stable at processing temperatures of at least 450° F. The inventive roofing product may have a tear strength of at least 1,700 grams.

The foregoing and other objects, features, and advantages of the general inventive concepts will become more readily apparent from a consideration of the detailed description that follows.

BRIEF DESCRIPTION OF THE DRAWINGS

FIG. 1 graphically illustrates the viscosity of exemplary shingle coating asphalt compositions vs. shear rate, compared to a control composition that does not include a modified vegetable oil additive.

DETAILED DESCRIPTION

As used herein the term "asphalt" is meant to include asphalts produced from petroleum refining, including residua from atmospheric distillation, from vacuum distillation, and from solvent de-asphalting units, recycled asphalt streams, such as re-refined motor oil bottoms. Mixtures of different asphalts can also be used. The invention can also be used with natural bitumen like the products extracted from the oil sands in Alberta or asphalts derived from oil sands by various refinery processes.

By "roofing shingle coating asphalt" or "coating asphalt", as used herein, is meant an asphalt that is suitable for use as a coating asphalt to make asphalt roofing shingles as defined by ASTM D 3462: a softening point minimum of 190° F. (88° C.) to 235° F. (113° C.) and a penetration at 77° F. (25° C.) minimum of 15 dmm. In other exemplary embodiments, the term "coating asphalt" meets one or more of the tighter specifications that may be used by shingle manufacturers. Some examples of these specifications include a softening point of 200° F. (93° C.) to 215° F. (102° C.), a penetration at 77° F. (25° C.) of 16 dmm to 22 dmm, a melt viscosity at 400° F. (204° C.) of 150 cps to 450 cps, a durability of greater than 60 cycles in the weatherometer, and a flashpoint of greater than 550° F. (288° C.). Other examples of suitable coating asphalts include those with a softening point of 212° F. (100° C.) to 220° F. (104° C.), a penetration at 77° F. (25° C.) of 16 dmm to 20 dmm, a melt viscosity at 400° F. (204° C.) of 275 cps to 375 cps, and a flashpoint of greater than 550° F. (288° C.). In some manufacturers' specifications, a minimum specific target penetration of 15 dmm or 17 dmm is used, although there are a range of different manufacturer specifications.

In addition, manufacturers often specify other properties, such as stain index, as well as proprietary tests that characterize rheology or durability. The stain index may be measured according to ASTM D 2746, which measures the tendency for oil components to separate spontaneously from asphalt. The separation of the oil from the asphalt may cause staining of the roofing products.

The properties of the asphalt compositions of the present invention may be measured by any suitable test known and accepted in the art. In the description provided herein, the asphalt properties are measured as follows: softening point or "SP" by ASTM D36; penetration or "pen" by ASTM D5 run at 25° C.; melt viscosity by ASTM D4402 run at 400° F. (204° C.) with a Model LV Brookfield Viscometer, using a no. 18 spindle, 6 RPM or a Model RV Brookfield Viscometer, using a no. 21 spindle, 50 RPM; durability by ASTM D4798; flashpoint by ASTM D92; and stability by ASTM D3791 modified to run at oven temperature of 260° C. for up to 5 days or similar test procedure.

The general inventive concepts relate to treating hard asphalt material, such as a paving grade asphalt, to produce coating grade asphalt that may be used in roofing applications. Although the application will describe the exemplary embodiments in terms of "paving grade asphalt," it should be appreciated that any hard asphalt material may be used, including mixtures of paving grade asphalt and hard asphalt. By "paving grade asphalt," as used herein, is meant an asphalt that has a softening point within the range of about 60° F. to about 130° F. and a penetration value of at least 25 dmm. Paving grade asphalts are not typically used in roofing applications because such asphalts are not able to achieve the properties required to be considered "coating grade" asphalt by traditional processing methods, such as air blowing. Particularly, the paving grade asphalt cannot achieve both a softening point between 185° F. (85° C.) to 250° F. (121° C.) and a penetration value of at least 15 dmm by the air blowing process alone. For example, paving grade asphalt that is blown to a suitable softening point may have a penetration that is too low. Typically an asphalt that is not able to be used as feedstock for the air blowing process to make coating asphalt has a lower penetration and a higher viscosity than acceptable when produced in the refinery.

Any suitable paving grade asphalt(s) can be used, for example paving asphalts which meet the PG64/22 specifications (AASHTO M320). PG64/22 is the most common paving specification in the United States. Paving asphalts were previously graded by viscosity and a common asphalt that is similar to the PG64/22 grade and usable in this method is the old AC20 grade (ASTM D 3381). Some other examples of paving asphalts that may be suitable include PG 67/22, PG 70/22, PG 58/22, PG 58/28, PG 58/22, PG 70/16, PG 70/10, PG 67/10, pen grade 40/50, pen grade 60/70, pen grade 85-/100, pen grade 120/150, AR4000, AR8000, and AC/30 grade.

In one exemplary embodiment, the inventive coating asphalt composition has the advantage of being prepared using a wide array of paving grade asphalt materials, such as different types of paving asphalts used independently or as a mixture of various types of asphalt, such as, for example, solvent extracted asphalt, naturally occurring asphalt, synthetic asphalt, and recycled asphalt. Typical paving grade asphalts are the straight run asphalts derived from the atmospheric and vacuum distillation of crude oils, or are made by blending vacuum tower residua with residua from solvent de-asphalting units or re-refined motor oil bottoms or other recycled streams.

The present invention is directed to a coating asphalt composition, the use of a coating asphalt composition to produce roofing products, and a method for producing a coating asphalt composition for manufacturing roofing products, such as roofing shingles, rolled shingles, roofing coating, and built-up roofing asphalts (BURA). The present application provides the ability to use paving grade asphalt in preparing a shingle coating by the incorporation of an ester additive, such as modified vegetable oil or fat, in the paving grade asphalt.

The coating asphalt composition may be formed using a paving grade asphalt in a traditional asphalt processing line. In some exemplary embodiments, the process of preparing a coating asphalt composition involves heating a paving grade asphalt to a temperature of about 120° F. (49° C.) to about 550° F. (288° C.) until the paving grade asphalt liquefies into a molten asphalt material. The molten asphalt may then be oxidized to adjust the properties of the molten paving grade asphalt, particularly to increase the softening point. Various methods of oxidizing the molten asphalt flux may be used, such as, for example, the "air blowing" process. The air blowing process involves the oxidation of an asphalt composition by bubbling or blowing oxygen containing gas, such as air, for example, through molten asphalt at an elevated temperature for a particular period of time, such as from about 1 hour to about 72 hours. The amount of time depends on various factors, such as the type of asphalt feedstock used, the processing temperature, the air flow rate, the design of the process equipment, and the desired characteristics of the coating asphalt to be produced.

In some exemplary embodiments, the oxygen enriched gas contains about 25 weight percent to about 35 weight percent oxygen and about 65 to about 75 weight percent nitrogen. Chlorine enriched air or pure oxygen may also be utilized in the air blowing step. Catalysts, such as, for example, ferric chloride, or any form of phosphoric acid, aluminum chloride, zinc chloride, and organic sulfonic acids, may be used in the oxidation process to achieve desired properties and may increase the rate of reaction.

In conventional coating asphalt manufacturing processes, molten asphalt feedstock is loaded into a converter (oxidizer) at an increased temperature and air is bubbled or blown through the molten asphalt and air-blown until the asphalt reaches a target penetration value, particularly a penetration greater than 15 dmm. The softening point, penetration, and viscosity of the output asphalt material are inter-dependant on the input asphalt material selected and one property can be singly adjusted without the other two properties adjusting to a corresponding degree. As described above, due to the nature of paving grade asphalt, the air-blowing process alone is insufficient to produce an output asphalt material with properties that fall with each of the penetration, softening point, and viscosity requirements to be considered "coating grade" asphalt.

Various methods for overcoming this difficulty in preparing a coating grade asphalt from paving grade asphalt has been to "under-blow" the molten asphalt feedstock, whereby the asphalt is air blown to a penetration value that is within or slightly higher than the target penetration range for the coating asphalt (about 15-23 dmm), but the softening point is lower than a target softening point range, such as in the range of about 140° F. to about 185° F. "Under-blowing" refers to stopping the oxidation process prior to sufficiently lowering the penetration value.

Processes that under-blow a molten asphalt material may incorporate an additive into the molten asphalt material in an attempt to adjust the material's properties to those desired for a particular application. For instance, U.S. Pat. No. 7,951,239 describes introducing a hard wax pellet into the molten asphalt to increase the softening point of the asphalt to a target softening point range, while maintaining a desirable penetration value. Additional additives, such as polyphosphoric acid may also be added to further soften the product. However, as mentioned above, thoroughly mixing a hard wax component with a molten asphalt component is difficult in traditional processing lines. Therefore, the processing steps and machinery used needs to be adjusted to accommodate this type of mixing. Such adjustments to the processing machinery may require significant capital costs, which make such a process expensive and difficult to implement. Additionally, such processing steps often include the addition of a catalyst, such as ferric chloride, which produces hydrochloric acid emissions during the oxidation process. To address such an emissions issue, a technology called Maximum Attainable Control Technology, which aims to reduce toxic emissions, may be used. However, such a technology is expensive and may be cost prohibitive.

It is one object of the present inventive process to eliminate the costly introduction of solid wax and provide a process for producing a thermally stable shingle coating asphalt composition using paving grade asphalt that can be used on traditional processing lines without the need for costly updates to the machinery. In the present exemplary process, rather than under-blowing the molten asphalt material, the molten asphalt may be "over-blown" or air blown to a penetration value within or slightly lower than a target softening point range, such as to a penetration value around or slightly below 15 dmm. By over-blowing the molten asphalt, the resulting molten asphalt material may have a softening point that is higher than the target softening point range for coating asphalts, such as between about 210-240° F. (about 98.8 to 116° C.). Therefore, in some exemplary embodiments, the over-blown molten asphalt material may have a first penetration value that is within the target penetration range, while having a first softening point that is higher than the target range.

In some exemplary embodiments, the over-blown molten asphalt material may be transferred into an intermediate blend tank for further processing. In this step, an additive may be incorporated into the intermediate blend tank and mixed with the over-blown molten asphalt. In some exemplary embodiments, the additive softens the paving grade asphalt, causing the penetration value to at least slightly increase and the softening point to at least slightly decrease. In some exemplary embodiments, the mixture of the additive with the paving grade asphalt lowers the softening point of the asphalt to between about 200-220° F. (about 93-104° C.), if at all. In some exemplary embodiments, introduction of the additive does not significantly affect the penetration value of the molten asphalt material and maintains the penetration value in an acceptable target coating asphalt range, which is at least about 15 dmm. In other exemplary embodiments, the additive slightly increases the resulting penetration value to between about 15 and about 20 dmm. Additionally, addition of the additive in the molten asphalt material brings the melt viscosity at 400° F. within the desired range for a shingle coating asphalt composition, which is less than 450 cps, and particularly between about 250 cps to 450 cps.

The additive may comprise one or more ester compound, such as, for example, oils, fats, and plasticizers. In some exemplary embodiments, the additive includes a vegetable oil and/or fat of any variety known and generally available in the art. In some exemplary embodiments, the additive comprises a vegetable oil, such as, for example, corn, soybean, coconut, castor, tall, and the like. In other exemplary embodiments, the additive comprises a fat, such as, for example, butter, lard, beef tallow, and the like. In yet other exemplary embodiments, the additive comprises a plasticizer, used independently, or in combination with the vegetable oil and/or fat. Such a plasticizer may comprise an ester compound, such as a diester or polyester, such as a phthalate, benzoates, adipates, trimellitates, and the like. Although this application with be described in tennis of a vegetable oil additive, it should be understood that any of the above-referenced additives may be used as an alternative to the vegetable oil additive, or in combination.

Animal fats, such as tallow or lard, are more saturated than other types of oils and fats, meaning that more of the carbon atoms are bound to hydrogen atoms, rather than other carbon atoms, such that there are fewer double bonds. Therefore the chain of carbon atoms is fully "saturated" with hydrogen atoms. Saturation of fats and oils allows them to harden at higher temperatures. As you increase the number of double bonds in an oil or fat, the ability to gain a conformation that would make them solid is reduced, so the oil or fat remains liquid. Additionally, saturated oils and fats are more stable than unsaturated oils and fats. Therefore, unless the oils/fats are modified in some way, unsaturated oil or fats may begin to decompose when exposed to high temperatures. Accordingly, some exemplary embodiments, the oil/fat additive in the present application is at least partially saturated.

The degree of saturation/unsaturation of the oil or fat may be tested by adding iodine to the oil/fat. Double bonds react with iodine, therefore, the higher the iodine value, the more carbon double bonds are present in the oil/fat. The amount of iodine in grams absorbed per 100 g of the oil is the iodine value, which is expressed as the $I_2$ value. The higher the iodine value, the more unsaturated the oil and the higher the potential for the oil to polymerize.

Although the present invention will be described herein as comprising a vegetable oil additive, it should be understood that any of the above-described additives may be used in the alternative or in addition. As is known in the art, vegetable oils are environmentally preferred over petroleum-based oil because they are both biodegradable and non-toxic. Vegetable oils are comprised of triglycerides, which include glycerol and three fatty acids substituted for the hydroxyl groups. Vegetable oils have a low molecular weight (about 800-900) and have varying degrees of unsaturation, which may hinder the thermal stability of the oil at high temperatures. As is well known in the art, saturated oils and fats are more stable than unsaturated oils and fats. The vegetable oils may be modified in any way well known and accepted in the art, such as hydrogenation and/or oxidation, to improve the stability and compatibility of the vegetable oil in the paving grade asphalt composition.

In some exemplary embodiments, the vegetable oil is modified by full or partial hydrogenation, oxidation, thermolysis, or a combination of the two. The process of hydrogenation includes treating the vegetable oil with a hydrogen gas at high temperature and pressure, optionally in the presence of a catalyst. Hydrogenation reduces the carbon-carbon double bonds to single bond, with two hydrogen atoms forming single bonds with the free carbon atoms. As the degree of saturation increases, the oil's viscosity and melting point also increase, making the vegetable oil more thermally stable at high temperatures. Hydrogenation lowers the iodine value of the oil.

Alternatively, or in addition to hydrogenation, the vegetable oil may be modified by oxidation or thermolysis. Generally, both oxidation and thermolysis reactions occurs at elevated temperatures, such as about 95° C. to about 150° C. During oxidation, oxygen is added to the oil and the oxygen molecules react with the double bonds present in the triglyceride molecules that make up the oil, reducing the number of double bonds present. The oxygen molecules will also react with the double bonds on other triglyceride molecules, causing the triglycerides to essentially hook together, which raise the molecular weight of the oil. In some exemplary embodiments, the modified vegetable oil has a molecular weight of about 900 to about 5000.

Thermolysis is another form of oil modification, which includes chemical decomposition by heat. Heat is applied to the oil in the absence of oxygen, causing any carbon double bonds to break and increasing the degree of saturation of the oil.

In some exemplary embodiments, the additive, in this instance vegetable oil, is modified to obtain a essentially saturated modified vegetable oil ("MVO") having an iodine value no greater than about 115. In other exemplary embodiments, the modified vegetable oil has an iodine value no greater than about 70.

The MVO additive may be introduced into the over-blown molten paving grade asphalt material in any amount to achieve the targeted softening point, while maintaining a penetration value within the target range. In some exemplary embodiments, the additive is added into the over-blown paving grade asphalt in an amount between about 0 and about 30 weight percent of the total shingle coating asphalt composition. In other exemplary embodiments, the additive is included in an amount between about 1 and 20 weight percent of the total shingle coating asphalt composition, and particularly, between about 2 and 15 weight percent of the total shingle coating asphalt composition.

In accordance with one aspect of the present application, the modified vegetable oil is thermally stable and capable of withstanding high processing temperatures, such as temperatures encountered in traditional roofing processes (up to about 500° F.). Such high processing temperatures are consistent with conventional asphalt processes, which range in temperature from about 400° F.-500° F. (204° C. to 260° C.). However, conventional vegetable oils will degrade at such high temperatures and therefore, if such additives were used, the molten asphalt feedstock had to be cooled prior to the addition of the additive. For example, U.S. 2009/0137705 discloses a process for preparing a hot-melt flowable asphalt product that incorporates an additive, such as vegetable oil, at low temperatures between 140° C. (248° F.) and 180° C. (356° F.).

However, it is well known that lowering the processing temperature of asphalt processes causes the viscosity of the asphalt materials to increase. A high viscosity coating composition reduces the amount of filler than can be used in the coating composition. However, the use of filler reduces the cost of the shingle coating asphalt composition, since filler materials are generally lower in cost than the asphalt materials themselves. Therefore, in order to keep the viscosity of the asphalt composition low, the processing temperatures are consistent with conventional processing temperatures, particularly between 400-500° F. This high temperature processing is possible due at least in part to the thermal stability of the MVO at high temperatures. By modifying the oil, such as by hydrogenation, the oil has less double bonds and a lower iodine number, imparting a greater stability to the oil. Therefore, the MVO may be mixed into the over-blown molten asphalt and processed using conventional asphalt processing systems, which will eliminates the time and cost of manufacturing new processing lines to accommodate a lower temperature.

Optionally, secondary additives may also be included in the over-blown molten asphalt composition. Such secondary additives may include, for example, sulfur, polyphosphoric acid (PPA), ferric chloride, waxes of animal or plant origin, hydrocarbon wax, elastomers, plastomers, surfactants, lime, aluminosilicates, resin, zeolite, and other such additives. The secondary additives may be included in any amount desired to achieve the desired asphalt properties. In some exemplary embodiments, secondary additives may be included in an amount between about 0 to about 10 weight percent of the total coating asphalt composition. In other exemplary embodiments, each secondary additive is included in an amount between about 1.0 and 5 weight percent.

In some exemplary embodiments, the thermal stability of the MVO additive provides the inventive shingle coating asphalt composition a resistance to a phenomenon known as "fallback." Fallback is a phenomenon that occurs when asphalt is exposed to high temperatures for a prolonged period of time. In general, the higher the temperature or the longer the asphalt is exposed to heat, the lower the softening point and higher the penetration value may become. As the softening point decreases, the asphalt material may become prone to sliding downhill off of a roof or staying soft when the roof is exposed to high ambient temperatures.

Although addition of the vegetable oil additive tends to at least slightly lower the softening point, it has been discovered that the resulting coating asphalt composition unexpectedly resists the fallback phenomenon. Therefore, in some exemplary embodiments, even after being exposed to heat (between 350° F. to 500° F.) for up to 72 hours, or more, the inventive coating asphalt does not exhibit a significant change in softening point or penetration level. In some exemplary embodiments, the coating asphalt composition unexpectedly resists fallback after being exposed to heat for at least 24 hours, or for at least 48 hours, or for at least 72 hours. In some exemplary embodiments, the coating asphalt composition resists fallback after being exposed to heat for at least 182 hours.

The thermal stability of the inventive shingle coating asphalt composition may be further reflected by the coating having a good stain index, as defined in ASTM D2746. ASTM D2746 provides a test method for measuring the tendency for oil components to separate spontaneously from asphalt. The separation of the oil components may cause staining in asphalt roofing products and adjacent materials in storage and use. The lower the stain index, the more stable the asphalt is and the lower the tendency to stain. In some exemplary embodiments, the inventive shingle coating asphalt composition has a stain index less than 10. The low stain index of the inventive shingle coating asphalt composition is unexpected, since one would expect the addition of a softening agent, such as oil, into asphalt would lead to a higher stain index, since the oils may be more inclined to leech out of the shingles.

To assist in the ease of mixing and applying the coating composition, the viscosity should be low while under pressure. However, once the coating is applied to the shingle, a higher viscosity is desired to ensure that the coating holds firmly on the shingles. FIG. 1 illustrates one aspect of the inventive shingle coating composition, wherein the composition exhibits a high viscosity when exposed to low levels of shear stress and a lower viscosity as the shear rate increases. As shown in FIG. 1, each of the exemplary shingle coating asphalt compositions tested demonstrated viscosities that were lower than the control compared to the same shear rates, the control consisting of a shingle coating composition without a modified ester additive. The low viscosities each increase as the shear rate is reduced.

In some exemplary embodiments, the shingle coating asphalt composition produced in accordance with the present invention demonstrates a durability that is at least comparable to the durability of coating asphalt compositions produced with traditional "coating grade" asphalt feedstock. Durability is one of the most sought after properties for roofing products, since roofing products are often exposed to unfavorable temperature and weather conditions, and the ability for the roofing product to withstand such conditions is essential. One method of testing the durability of a coating composition is known as a "spark test," outlined in ASTM D1670. The spark test measures the extent of cracking and/or pitting of asphalt films to determine the extent of deterioration that occurs due to weathering. A shingle coating asphalt composition is applied to an electrically conductive backing, such as aluminum, and exposed to accelerated weathering caused by UV lighting and controlled conditions of humidity, moisture and temperature. Throughout the weathering, asphalt coatings may crack, which will expose the aluminum backing. A spark probe is then used to conduct a current in various locations of the panel. The probe will be able to conduct a current at any point in the film that has cracked in response to the weathering. Conventional coating grade asphalts are desired to pass 90 days of accelerated weathering prior to showing signs of degradation. However, in some exemplary embodiments, the present shingle coating composition withstands at least 150 days of accelerated weathering.

Additionally, another important shingle property is tear strength, since it contributes to shingle splitting. Tear strength is a shingle property that is defined under ASTM D 3462. The minimum tear strength listed under this standard is 1,700 grams. In some exemplary embodiments, the inventive shingle coating asphalt composition may be used to produce a shingle with a tear strength of at least 1,700 grams. Additionally, in some exemplary embodiments, the inventive shingle coating asphalt composition is capable of producing a shingle that complies with the additional requirements set forth in ICC-ES Acceptance Criteria for Alternative Asphalt Roofing Shingles (AC438).

The general inventive concepts have been described above both generically and with regard to various exemplary embodiments. Although the general inventive concepts have been set forth in what is believed to be exemplary illustrative embodiments, a wide variety of alternatives known to those of skill in the art can be selected within the generic disclosure. The general inventive concepts are not otherwise limited, except for the recitation of the claims set forth below. Additionally, following examples are meant to better illustrate the present invention, but do in no way limit the general inventive concepts of the present invention.

Example 1

Three sets of shingle coating asphalt compositions were prepared using both modified and non-modified vegetable oil additives. Sample 1 was prepared by mixing 80% of a conventional paving asphalt (PG 64-22) with 20% of a non-modified vegetable oil additive. The mixture was then oxidized at 350° F. in a converter to a target softening point range (220-220° F.). However, as shown below in Table 1, the composition was unable to hit the target softening point even after air-blowing for a period of 30 hours. Additionally, it was observed that as blowing time increased, the composition became unstable, in that the softening point, penetration and viscosity changed significantly as time passed.

TABLE 1

| Additive | Wt. % | Mix Temp. (° F.) | Age Time | SP (° F.) | Pen. (dmm) | Vis. (cps) |
|---|---|---|---|---|---|---|
| SAMPLE 1: non-modified VO | 20 | 350 | 18 | 135 | 71 | 95 |
| SAMPLE 1: non-modified VO | 20 | 350 | 23 | 149 | 57 | 142 |
| SAMPLE 1: non-modified VO | 20 | 350 | 30 | 175 | 45 | 280 |
| SAMPLE 2: (MVO with IV 1.3) | 20 | 350 | 1 | 196 | 7 | 388 |
| SAMPLE 2: (MVO with IV 1.3) | 20 | 350 | 48 | 200 | 7 | 128 |
| SAMPLE 2: (MVO with IV 1.3) | 20 | 350 | 72 | 204 | 6 | 192 |
| SAMPLE 3: (MVO with IV 1.3) & (MVO with IV 67.8) | 10 & 10 | 350 | 1 | 189 | 18 | 178 |
| SAMPLE 3: (MVO with IV 1.3) & (MVO with IV 67.8) | 10 & 10 | 350 | 48 | 195 | 18 | 228 |
| SAMPLE 3: (MVO with IV 1.3) & (MVO with IV 67.8) | 10 & 10 | 350 | 72 | 204 | 17 | 270 |

Samples 2 and 3 comprise shingle coating asphalt compositions that incorporate modified vegetable oil as an additive. In each example, a conventional paving asphalt was "over-blown" to a softening point of 241° F. In Sample 2, a single type of modified vegetable oil additive with an iodine value of 1.3 was added, such that the paving asphalt comprised 80 weight percent and the additive comprised 20 weight percent. In Sample 3, a mixture of two different modified vegetable oils, one having an iodine value of 1.3 and one having an iodine value of 67.8, was added to the overblown asphalt composition, such that the total asphalt composition includes 10 weight percent of each type of additive and 80 weight percent of the paving grade asphalt. As shown above in Table 1, in both Samples 2 and 3, the thermal stability of the asphalt composition significantly improves over Sample 1, in that there are only minor changes in the softening points, penetrations, and viscosities over time.

Example 2

Once it was discovered that the modified vegetable oils improved the thermal stability of the shingle coating asphalt compositions, samples were then tested to determine if lower amounts of additive could be used to achieve the desired results. In Samples 4 and 5 (illustrated in Table 2, below) shingle coating asphalt compositions were prepared by over-blowing molten paving asphalt to a softening point of 223° F. and then mixed with 8 weight percent of a modified vegetable oil additive at 350° F. and aged for periods of 1 hour and 72 hours. As illustrated below in Table 2, the compositions were able to achieve the targeted softening points, penetrations and viscosities after mixing for one hour. Additionally, the asphalt compositions demonstrated thermal stability, since the properties did not significantly change after continued mixing at an increased temperature.

TABLE 2

| Additive | Wt. % | Mix Temp. (° F.) | Age Time | SP (° F.) | Pen. (dmm) | Vis. (cps) |
|---|---|---|---|---|---|---|
| SAMPLE 4 (MVO with IV 67.8) | 8 | 350 | 1 | 200 | 17 | 329 |
| SAMPLE 4 (MVO with IV 67.8) | 8 | 350 | 72 | 204 | 18 | 388 |
| SAMPLE 5 (MVO with IV 50) | 8 | 350 | 1 | 200 | 19 | 308 |
| SAMPLE 5 (MVO with IV 50) | 8 | 350 | 72 | 204 | 18 | 448 |

Example 3

The thermal stability of the inventive shingle coating asphalt compositions was then tested at an increased temperature of 450° F. With a standard blowing process, a conventional paving asphalt (PG 64-22) was over-blown to a softening point greater than 220° F. and a penetration value below 15 dmm. The over-blown paving asphalt was then blended with 8 weight percent of a modified vegetable oil additive at an increased temperature 450° F. The mixtures were then aged for a period of 72 hours at the increased temperature of 450° F.

TABLE 3

| Oil additive ID | Wt. % | Initial SP (° F.) | Initial Pen. (dmm) | Initial Vis. (cps.) | 72 hrs @ 450° F. SP (° F.) | 72 hrs @ 450° F. Pen. (dmm) | 72 hrs @ 450° F. Vis. (cps) |
|---|---|---|---|---|---|---|---|
| SAMPLE 6 (MVO with IV 67.8) | 8 | 205 | 15 | 366 | 204 | 16 | 444 |
| SAMPLE 7 (MVO with IV 67.8) | 8 | 208 | 18 | 277 | 202 | 17 | 404 |
| SAMPLE 8 (MVO with IV 72) | 8 | 203 | 18 | 343 | 200 | 19 | 384 |
| SAMPLE 9 (MVO with IV 44) | 8 | 202 | 15 | 424 | 200 | 16 | 355 |
| SAMPLE 10 (MVO with IV 44) | 8 | 207 | 18 | 385 | 202 | 19 | 288 |
| SAMPLE 11 (MVO with IV 55) | 8 | 206 | 16 | 418 | 206 | 15 | 404 |
| SAMPLE 12 (MVO with IV 55) | 8 | 205 | 18 | 309 | 201 | 17 | 405 |
| SAMPLE 13 (MVO with IV 50) | 8 | 200 | 19 | 308 | 199 | 16 | 450 |

As shown in Table 3, above, when the additive was initially mixed with the asphalt, the softening points of the compositions were each within the target softening point range of 200-220° F. and the penetration values were between 15 and 20 dmm. Additionally the viscosities of the coating compositions were within the coating-grade acceptable viscosity of 250-450 cps. Once the initial mixing period was complete, the coating asphalt compositions were aged for a period of 72 hours at 450° F. As illustrated in Table 3, none of the compositions demonstrated a significant changes in softening point, penetration values, or viscosities. Additionally, the compositions remained within the desired "coating-grade" asphalt requirements, described above.

Example 4

The thermal stability of the inventive shingle coating asphalt compositions was then further tested at an increased temperature of 500° F. Molten paving grade asphalt was over-blown to a softening point of 226° F. Several samples were then prepared by mixing a modified vegetable oil additive into the over-blown asphalt composition at 500° F. Table 4, below, illustrates Sample 14(a) was produced by mixing the paving grade asphalt with 5% of a modified vegetable oil additive and then aged at 500° F. for 24 hours. This composition was then aged for an additional 24 hours at 500° F., for a total of 48 hours and is listed as Sample 14(b). Similarly, Sample 15(a) was produced by mixing the paving grade asphalt with 6% of the same modified vegetable oil additive of Sample (a and b)14 and aging the composition at 500° F. for 24 hours. The composition of Sample 15(a) was then further aged at 500° F. for another 24 hours, for a total of 48 hours, and is listed as Sample 15(b). The softening point, penetration value, and viscosity of each exemplary shingle coating asphalt composition was tested at the various set points. The results are illustrated in Table 4 below.

TABLE 4

| Additive | Wt. % | Mix Temp. (° F.) | Mix Time | SP (° F.) | Pen. (dmm) | Vis. (cps) |
|---|---|---|---|---|---|---|
| SAMPLE 14(a) (MVO with IV 50) | 5 | 500 | 1 | 213 | 13 | 439 |
| SAMPLE 14(b) (MVO with IV 50) | 5 | 500 | 48 | 210 | 16 | 377 |
| SAMPLE 15(a) (MVO with IV 50) | 6 | 500 | 1 | 220 | 11 | 639 |
| SAMPLE 15(b) (MVO with IV 50) | 6 | 500 | 96 | 200 | 15 | 288 |
| SAMPLE 16(a) (MVO with IV 47) | 8 | 500 | 1 | 211 | 15 | 437 |
| SAMPLE 16(b) (MVO with IV 47) | 8 | 500 | 72 | 194 | 17 | 291 |
| SAMPLE 17(a) (MVO with IV 112) | 6 | 500 | 1 | 204 | 16 | 320 |
| SAMPLE 17(b)(MVO with IV 112) | 6 | 500 | 48 | 192 | 18 | 283 |

As shown above in Table 4, each Sample achieved a desirable softening point (between 200 and 220° F.) after being mixed at 500° F. Table 2 further illustrates that after further mixing at an increased temperature of 500° F., the asphalt compositions were in fact improving: the softening points were lowering, the penetrations were increasing, and the viscosities were lowering. Therefore, the asphalt compositions were becoming more effective after being exposed to higher temperatures, which was not expected.

Example 5

Exemplary shingle coating asphalt compositions were prepared using a paving grade asphalt material (PG 64-22) that was over-blown using conventional blowing methods, to achieve a softening point above 220° F. Various modified vegetable oil additives were then mixed with the over-blown asphalt and the staining tendency of the coating asphalt composition was tested according to the method provided in ASTM D2746-07. As shown below, each of the shingle coating asphalt compositions demonstrated a stain index less than 10, which indicates that the compositions are thermally stable and no oil leeched out of the composition.

TABLE 5

| Oil ID | Wt. % | Other Wt. % | Blend Composition Results SP (° F.) | Pen. (dmm) | Visc. (cps) | Stain |
|---|---|---|---|---|---|---|
| SAMPLE 18 (MVO with IV 50) | 8 | | 200 | 19 | 308 | 8.0 |
| SAMPLE 18 (MVO with IV 50) | 7 | | 205 | 15 | 402 | 4.7 |
| SAMPLE 19 (MVO with IV 62) | 8 | | 198 | 17 | 323 | 7.0 |
| SAMPLE 19 (MVO with IV 62) | 7 | | 200 | 17 | 344 | 6.3 |
| SAMPLE 20 (MVO with IV 112) | 8 | | 199 | 15.5 | 355 | 5.7 |
| SAMPLE 21 (MVO with IV 112) | 8 | | 202 | 15 | 424 | 6.3 |
| SAMPLE 22 (MVO with IV 55) | 8 | | 206 | 16 | 418 | 6.0 |
| SAMPLE 23 (MVO with IV 67.8) | 8 | | 205 | 15 | 366 | 7.0 |
| SAMPLE 24 (MVO with IV 67.8) | 8 | | 199 | 15.5 | 292 | 7.7 |
| SAMPLE 25 (MVO with IV 74) | 10 | | 213.5 | 17.5 | 671 | 4.0 |
| SAMPLE 26 (MVO with IV 74) | 10 | 0.1% S | 206 | 18 | 622 | 3.0 |
| SAMPLE 27 (MVO with IV 72) | 10 | | 204.5 | 20 | 415 | 3.7 |
| SAMPLE 28 (MVO with IV 72) | 10 | 0.1% S | 203 | 20 | 423 | 4.0 |

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A method for producing a shingle coating asphalt composition from
   a paving grade asphalt, said method comprising:
   heating a paving grade asphalt to produce a molten asphalt material;
   over-blowing the molten asphalt material to achieve a first penetration value that is at or below 15 dmm and a first softening point that is at least 210° F.;
   mixing an additive into said molten asphalt material to form a shingle coating asphalt composition, said additive comprising an ester compound,
   wherein the shingle coating asphalt composition includes a second softening point that is less than about 230° F., a second penetration value that is between about 15 and 20 dmm, and is thermally stable at temperatures of at least 450° F.

2. The method of claim 1, wherein said second softening point is between about 195° F. to 230° F.

3. The method of claim 1, wherein said ester compound comprises one or more of an oil, fat, and plasticizer.

4. The method of claim 3, wherein said ester compound comprises a vegetable oil.

5. The method of claim 4, wherein the vegetable oil is modified by oxidation or thermolysis to a molecular weight of 900 to 5000.

6. The method of claim 4, wherein, prior to incorporation of said ester compound into said molten asphalt material, said method further includes a step of modifying said ester compound by at least one of hydrogenation, oxidation, and thermolysis.

7. The method of claim 6, wherein said second softening point is between about 195° F. to about 230° F.

8. The method of claim 1, wherein said shingle coating asphalt composition has a melt viscosity at 400° F. below 450 cps.

9. The method of claim 1, wherein the additive is included in an amount from 8 to 20 wt. %, based on the total weight of the shingle coating composition.

10. The method of claim 1, wherein said additive has an iodine value that is between 50 and 115.

11. The method of claim 1, wherein said composition further includes at least one secondary additive selected from the group consisting of sulfur, polyphosphoric acid (PPA), ferric chloride, waxes of animal or plant origin, hydrocarbon wax, elastomers, plastomers, surfactants, lime, aluminosilicates, resin, and zeolite.

12. The method of claim 11, wherein said secondary additive is included in an amount between about 0.25 and 10 weight percent.

13. The method of claim 1, wherein said shingle coating asphalt composition has a stain index less than 10.

14. A roofing product having a coating made from a shingle coating asphalt composition formed according to the method of claim 1.

15. The roofing product of claim 14, wherein said roofing product comprises one or more of roofing shingles, rolled roofing, roof coatings, and built-up roofing asphalts.

16. The roofing product of claim 14, wherein said roofing product is a roofing shingle having a tear strength of at least 1,700 grams.

* * * * *